(12) United States Patent
Mackie

(10) Patent No.: US 7,541,688 B2
(45) Date of Patent: Jun. 2, 2009

(54) FLOATING APPARATUS FOR DEPLOYING IN MARINE CURRENT FOR GAINING ENERGY

(75) Inventor: Graeme Charles Mackie, North Shelds (GB)

(73) Assignee: Ocean Flow Energy Limited, North Shields, Tyne & Wear (GB)

( * ) Notice: Subject to any disclaimer, the term of this patent is extended or adjusted under 35 U.S.C. 154(b) by 208 days.

(21) Appl. No.: 11/667,902

(22) PCT Filed: Nov. 17, 2005

(86) PCT No.: PCT/GB2005/004432

§ 371 (c)(1),
(2), (4) Date: May 16, 2007

(87) PCT Pub. No.: WO2006/054084

PCT Pub. Date: May 26, 2006

(65) Prior Publication Data

US 2008/0050993 A1 Feb. 28, 2008

(30) Foreign Application Priority Data

Nov. 17, 2004 (GB) .................................. 0425303.5

(51) Int. Cl.
*F03B 13/00* (2006.01)
(52) U.S. Cl. ....................................................... 290/54
(58) Field of Classification Search .................... 290/54
See application file for complete search history.

(56) References Cited

U.S. PATENT DOCUMENTS

| | | | | | |
|---|---|---|---|---|---|
| 2,501,696 | A | * | 3/1950 | Souczek ........................ | 290/43 |
| 3,986,787 | A | * | 10/1976 | Mouton et al. ................. | 415/7 |
| 4,025,220 | A | * | 5/1977 | Thompson et al. ............. | 415/7 |
| 4,219,303 | A | * | 8/1980 | Mouton et al. ................. | 415/7 |
| 4,274,009 | A | * | 6/1981 | Parker, Sr. .................... | 290/43 |
| 4,383,182 | A | * | 5/1983 | Bowley ........................ | 290/43 |
| 4,993,348 | A | * | 2/1991 | Wald ........................... | 114/265 |

(Continued)

FOREIGN PATENT DOCUMENTS

CA 2421139 9/2004

(Continued)

*Primary Examiner*—Joseph Waks
(74) *Attorney, Agent, or Firm*—MacMillan, Sobanski & Todd, LLC

(57) ABSTRACT

A floating, semi-submerged, tethered device that supports a horizontal axis turbine and power generation equipment for extracting kinetic energy from a tidal stream or ocean current. A submerged body (1) is supported by surface piercing struts (2) of small water plane area (FIG. 6). The device is tethered to the seabed by a spread of mooring lines (12) that are deployed both into and away from the direction of the tidal current. A horizontal axis turbine (4) harnesses energy from the water flow and drives a generator housed within the body. A horizontal strut hydrofoil (24) corrects the trim of the device when subject to varying loads from the mooring system and can also be used to dampen pitch motion. Rudder flaps in the struts (25) can be used to counteract roll motion. Power is exported from the device to the seabed by an umbilical (17). A thrusters (22) can be used to constrain the rotation of the device about its mooring system to prevent excessive twist building up between the mooring lines and the power export umbilical.

32 Claims, 6 Drawing Sheets

U.S. PATENT DOCUMENTS

| | | | |
|---|---|---|---|
| 6,091,161 A * | 7/2000 | Dehlsen et al. | 290/43 |
| 6,849,963 B2 * | 2/2005 | Grinsted et al. | 290/42 |
| 7,105,942 B2 * | 9/2006 | Henriksen | 290/55 |
| 7,291,936 B1 * | 11/2007 | Robson | 290/43 |
| 7,352,074 B1 * | 4/2008 | Pas | 290/43 |
| 7,442,002 B2 * | 10/2008 | Mondl | 415/7 |
| 2002/0158472 A1 | 10/2002 | Robson | |

FOREIGN PATENT DOCUMENTS

| | | | |
|---|---|---|---|
| GB | 2348249 A * | 9/2000 |
| WO | WO00/42318 | 7/2000 |
| WO | WO03/056169 | 7/2003 |
| WO | WO2004/020283 | 3/2004 |
| WO | WO 2008009130 A1 * | 1/2008 |
| WO | WO 2008125707 A1 * | 10/2008 |

* cited by examiner

FLOATING APPARATUS FOR DEPLOYING IN MARINE CURRENT FOR GAINING ENERGY

This application is the National Phase of International Application PCT/GB2005/004432 filed Nov. 17, 2005, which designated the U.S. That International Application was published in English under PCT Article 21(2) on May 26, 2006 as International Publication Number WO 2006/054084A1. PCT/GB2005/004432 claims priority to U.K. Application No. 0425303.5, filed Nov. 17, 2004. Thus, the subject nonprovisional application claims priority to U.K. Application No. 0425303.5, filed Nov. 17, 2004. The disclosures of both applications are incorporated herein by reference.

FIELD OF THE INVENTION

The present invention relates to an apparatus for extracting energy from marine, ocean or tidal currents, and in particular to a vessel that in use is semi-submerged.

BACKGROUND OF THE INVENTION

The extraction and use of finite energy resources and more recently the phenomenon of global warming have lead to interest in extracting energy from renewable energy resources such as wind, wave and tidal power.

The present invention is concerned with extracting energy from marine, ocean or tidal currents.

A number of different solutions exist for generating electricity through recovering the kinetic energy from ocean and tidal currents. The majority of these devices consist of submerged turbines to extract power from the moving mass of water. Some solutions involve mounting the turbine and generator nacelle off a pile placed into the seabed or other bottom fixed support structure for example International Publication Number WO 2004/048774. The disadvantage of the seabed or bottom mounted device is that the current velocity tends to reduce with depth below the water surface thus reducing the potential power capture. This type of bottom mounted device is also difficult to install as the support structure has to be fixed in place by a vessel or jack-up rig that can maintain its position in a sea area of strong tidal flow making marine operations difficult and dangerous. Also the requirement to use a jack-up vessel for installation means that deployment in deep water is complex, expensive and has high safety risks and this limits the number of tidal locations where this type of solution can be applied. Much of the world's tidal and ocean current energy exists in deeper water sites. Seabed fixed solutions require special means for efficiently extracting energy from bi-directional currents such as tidal currents and these can involve expensive and complex solutions such as variable pitch turbine blades or turbine and nacelle pods that rotate through 180 degrees with each change in tide cycle to efficiently extract energy from flow from the opposite direction.

Other devices involve supporting the turbine and generator with the aid of a surface floating body for example International Publication Number WO 88/04362, European Publication Number EP 1467091 and UK Publication Number GB 2256011. The disadvantage of a surface float is that it is subject to wave induced whole body motions which are transmitted to the turbines and generators and reduce the efficiency of the turbine and increase the design loads on the fixed and rotating machinery, particularly the turbine blades. A surface float also attracts large forces from the wave which increases the size and cost of the mooring system. In addition, the wave particle velocity is at a maximum near the sea surface and may act to counter the steady tidal or ocean current velocity thus reducing the efficiency of a turbine mounted near the surface as in WO 88/04362.

The object of this invention is to provide a moored floating body capable of supporting the turbine at a sufficiently deeply immersed draught such that the body will not experience severe motions in waves that could adversely affect the turbine performance and attract high mooring loads. The moored body should preferably use conventional mooring line components and thus minimise mooring and anchoring costs. Preferably, the device should weathervane on its mooring system such that the turbine always faces into the current and is not held on an adverse heading due to wave and wind forces that are not aligned to the current direction. This will enable a simple low cost fixed pitch turbine to be used with good efficiency as the flow into the turbine will always be from the desired direction. Alternatively, the device may be capable of being moored such that it is permanently aligned with the predominant directions of tidal current flow. In this case the turbine blades will be designed to accommodate bi-directional current flow, either by symmetry of section in the manner described in Japanese patent 07-293421 or by fitting a variable pitch turbine. Preferably the vessel should be capable of scaling up to a size that can support a large diameter marine turbine for maximum efficiency but preferably the vessel should also be easy to remove from its operating site where there are fast flowing currents to sheltered waters or onshore sites for maintenance. The installation and recovery hook-up operation should preferably be capable of being carried out over a short timescale, preferably over a period of slack water at either end of the tidal cycle, so as to minimise the cost and risk associated with these activities.

This invention relates to a partially submerged floating body that has special hull form and appendages leading to effective support for a submerged turbine for extracting energy from marine ocean or tidal currents. The configuration of the device offers low motion characteristics in waves making it particularly suitable for deployment in sea areas that experience waves in combination with marine currents. The invention also relates to features for controlling the heading of the device to avoid the build up of twist in the power export umbilical linking the moored and free to weathervane floating device to the seabed.

The body is used to house power generation, control, switchgear, transformer and other mechanical and electrical components necessary for the generation and export of electrical power. These components, while contributing to the functionality of the marine current power generation device, are industry standard solutions and not in themselves part of the present invention.

Accordingly, this invention provides a submerged buoyant structure that either directly houses, or acts as a support for additional pod structures that house the gearbox, generator and power conditioning electrical equipment. The deep immersion of the horizontal axis turbine or turbines attached to the submerged body or bodies ensures that turbine blades are in a clean current stream less disturbed by wave induced water particle motion and that they are less susceptible to cavitation due to the static pressure head of water above the blades. Attached to the submerged main body is a vertical strut or a plurality of vertical struts that pierce the water surface. The struts piercing the water surface are of small water-plane area such that they do not attract large changes in buoyancy with change in wave elevation.

Active lifting surfaces can optionally be appended to the submerged body or struts such that the lift forces generated by the appendages in a tidal current flow can be used to generate a stabilising moment to counteract any dynamic roll or pitch motion of the body. In addition the active lifting surfaces can, if correctly positioned at some distance from the mooring attachment point, be used to generate a trimming moment to counteract adverse trim induced by the vertical force component of the mooring system such that the device can be maintained at or near level trim to ensure optimum performance from the horizontal axis marine turbine.

The combined buoyancy of the submerged body (or bodies) with its vertical strut (or struts) together with any interconnecting structure is designed to be sufficient to support the total weight of the device in water plus the vertical component of load of any mooring and power export umbilical system while maintaining a certain freeboard of strut above the design waterline which provides reserve buoyancy. The device has sufficient reserve of buoyancy above the waterline to ensure the survivability of the device in waves, in so far as the body remains positively stable and does not permanently submerge. However, the device is designed to allow extreme waves to sweep over it in order to minimise mooring forces.

The surface piercing strut or struts are streamlined to ensure low drag for current flow parallel to the axis of the turbine and high drag for current flow normal to the axis of the turbine such that they cause the device to align itself on the heading of least drag of the submerged body and struts which will be with the current flowing into the turbine. For the device that is moored at a single point at the forward end this is by pivoting about its mooring system into the predominant current direction. For the device that is spread moored the moorings will be set up to constrain the device to align with the current flow.

In a further embodiment of the device additional struts or skegs can be fitted that extend down under the submerged body to improve its directional stability and to provide support for the body when placed on dry land or on the deck of a vessel for maintenance.

The semi-submerged geometry is such that the main body of the device that supports the turbine and the associated power generation equipment is suspended below the waterline such that the device attracts less wave induced loads than if it were surface floating. The small water-plane area surface piercing strut or struts attract relatively little wave loading. Multiple struts are configured to counteract any trimming moment induced by the mooring system and to provide pitch and toll damping through increasing the longitudinal and transverse stiffness.

The torque generated by the horizontal axis turbine is transmitted to the generator, either directly or through a step-up gearbox or some other means of interconnection such as a hydraulic drive. For the generator to deliver power the fixed windings or stator must be anchored to a body that will resist rotation. With this device the rotation of the submerged body housing the generator is resisted by the transverse hydrostatic stabilising moment created by the surface piercing strut or struts being rotated from the vertical. As an additional feature, as the reaction against the turbine torque is always in the same direction of rotation, and as that torque increases with the speed of flow of the marine current, it is possible to generate an opposing torque by constructing the vertical streamline strut with some asymmetry such that it generates a transverse lift force, which will also increase with current speed, and this lift force will generate a moment about the horizontal turbine shaft axis that will counteract the turbine generated torque.

An alternative turbine arrangement incorporates two counter rotating rotors of approximately equal diameter, each driving its own generator, such that the reactive torque is cancelled out. This would be a more complex and expensive solution than the mono-plane rotor but would have the advantage of having a higher overall turbine efficiency.

The embodiment of the invention that is moored at a single forward point incorporates a mooring system that allows the device to pivot about this forward mooring connection point such that it naturally aligns itself with the predominant current direction. By allowing the device to align itself with the current direction it is possible to use a turbine or propeller blade section that gives optimum performance in one design direction of inflow, this direction remaining substantially constant irrespective of the geo-referenced direction of current flow due to the self alignment characteristics of the submerged body, strut or struts and mooring system. The mooring system has a spread of mooring lines that are laid out in line with the predominant current directions to minimise the excursion of the device under the influence of the current and to offer best transferral of current induced drag into the mooring lines. Preferably, the mooring lines are pre-tensioned such that the downstream unloaded mooring line or lines always experience a degree of tension to avoid snatch loads in high sea states.

Allowing the device to pivot freely about its mooring system raises the complexity of how to avoid entanglement of the mooring lines with the power export umbilical. The preferred solution adopted with this invention is to feed the power export umbilical down through the centre of the mooring arrangement, a solution that is commonly adopted on single point moored Floating Production, Storage and Offloading (FPSO) platforms used in offshore oil and gas recovery. If the device were allowed to build up rotation in one particular direction it would eventually lead to twist and possible damage to the umbilical. This twist of the umbilical can be avoided by incorporating a power transmission swivel connector in the umbilical, such as a slip ring system, which again is a solution generally adopted for FPSO's. Such a system would require to be sealed against ingress of water. An alternative solution is to avoid build up of multiple rotations of the device by controlling the rotation of the device between changes in direction of the current. A novel solution which may be adopted with this invention is to use a lateral thruster that ensure that the device aligns itself during slack water such that when the current builds up the drag forces on the body rotate the device in a prescribed direction that avoids the device rotating through more than 360 degrees from its original setup alignment. An onboard control system may monitor the degree of rotation from the original alignment through the use of a pair of Global Positioning System (GPS) tracker mounted above the waterline and spaced apart from each other. With this solution there is no requirement for a power export umbilical or mooring swivel and the umbilical is gripped where it exits the device so that all of the limited rotation of the umbilical occurs outside the device where there is the greatest freedom of rotation of the umbilical.

In an alternative embodiment of the device, the device is spread moored on an orientation that aligns the device with the ebb and flood predominant tidal directions. This embodiment employs two or more point mooring lines where each mooring connection point is as dose as possible to the longitudinal extremities of the device. By attaching the moorings to the extremities of the struts this ensures that the mooring lines are kept clear of the turbine blades. In this embodiment the device can have a turbine fitted at either end of the submerged body thus allowing increased power capture to offset the reduced efficiency of a turbine blade section that is symmetrical about its mid chord in order that it can cope with flow from either direction.

Other elements of the mooring system include mooring connection shackles and seabed anchors. The seabed anchors can be of any type employed in the marine and offshore industries for restraining ships and floating offshore structures as appropriate to the seabed conditions. The first section of the mooring line at the device end will preferably be chain or weighted line such that the slack mooring line hangs free and avoids fouling the turbine blades.

The geometry of the submerged body plus surface piercing strut is arranged such that the still water centre of gravity aligns longitudinally with the centre of buoyancy of the device taking account of the additional trimming moment induced by the mooring system and that the centre of buoyancy is vertically above the centre of gravity thus ensuring the positive stability of the device. This is achieved through ballasting the device to the correct draught and trim by using both solid ballast and filled water ballast tanks. The water ballast tanks can be emptied using compressed air or ballast pumps so as to reduce the draught and alter the trim of the device in order that the mooring connection point becomes more accessible.

BRIEF DESCRIPTION OF THE DRAWINGS

Preferred embodiments of the invention, by way of example, will now be described with reference to the accompanying drawings in which.

DETAILED DESCRIPTION OF THE PREFERRED EMBODIMENTS

Figure 1:
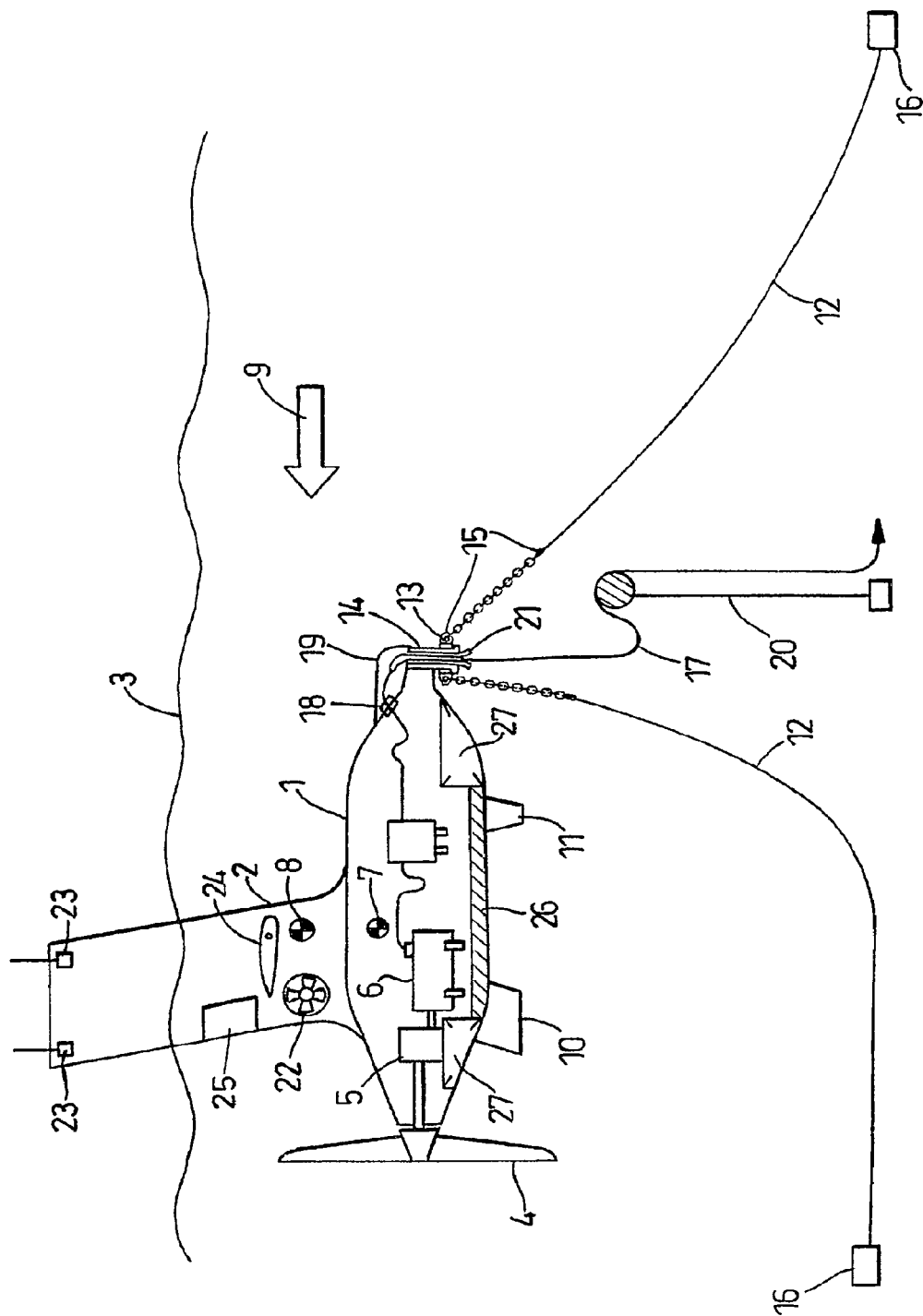
FIG. 1 shows a mono-hull, mono-strut variant in profile section.
Figure 3:
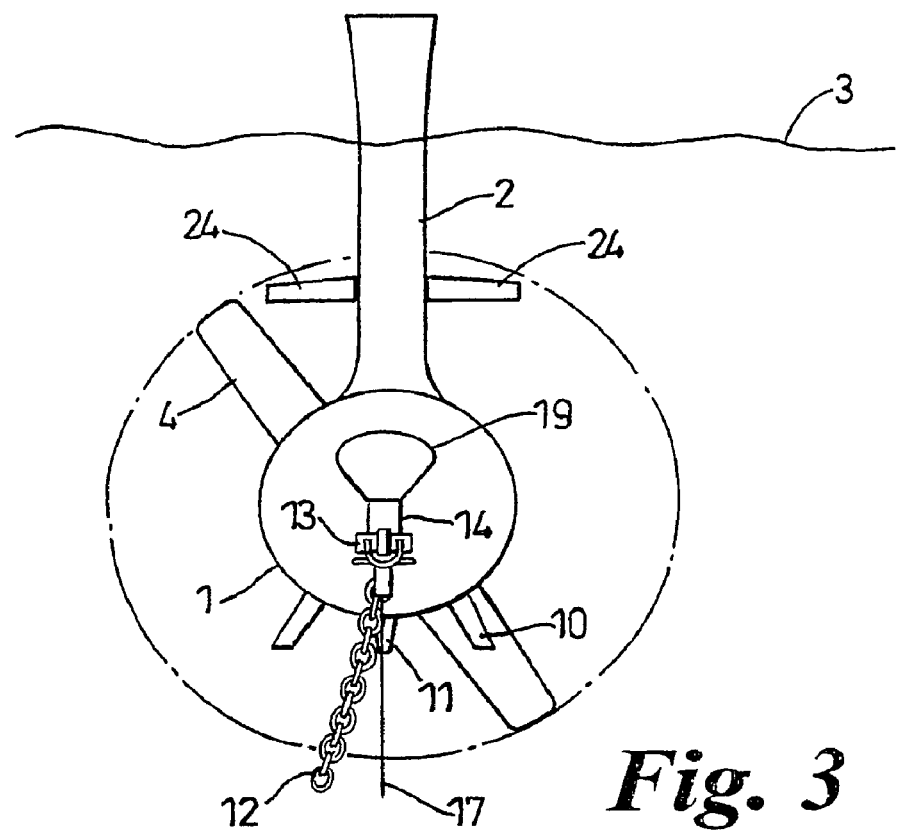
FIG. 3 shows the mono-hull, mono-strut variant in transverse view looking onto the mooring attachment end.
Figure 4:
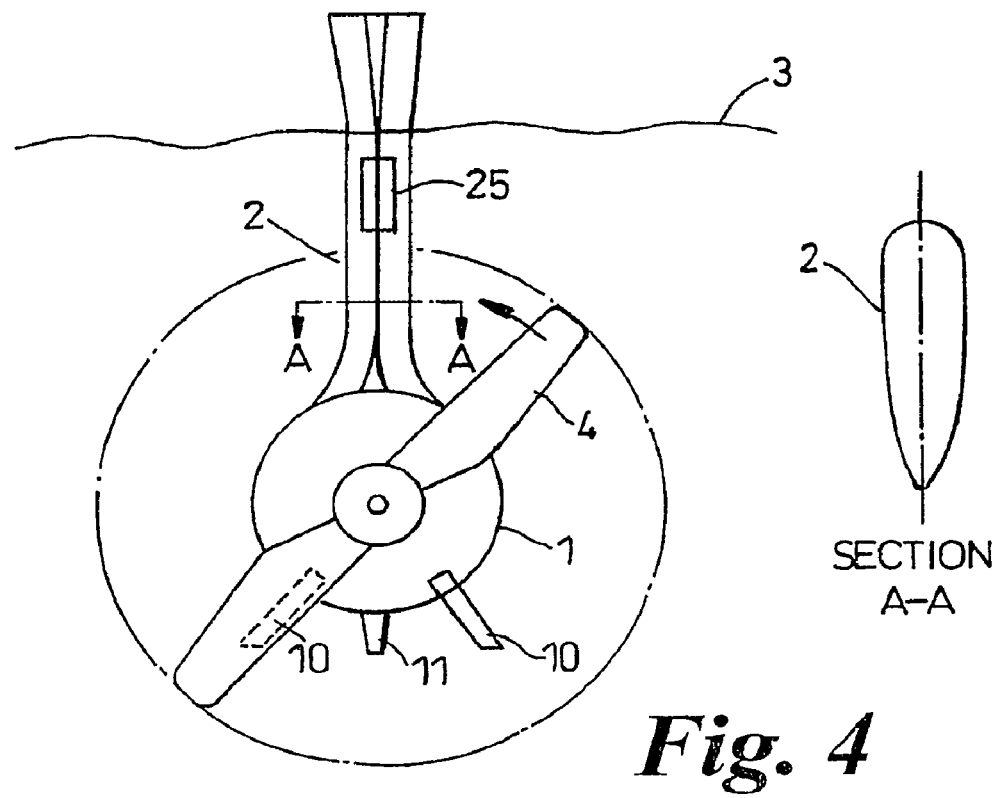
FIG. 4 shows the mono-hull, mono-strut variant in transverse view looking onto the turbine blade end.

The embodiment of the invention shown in FIGS. 1, 3 and 4 is a mono-hull variant with a single vertical strut. The device consists of a submerged nacelle body (1) with a substantially vertical strut (2) that pierces the water surface (3). The strut piercing the water surface is of small waterplane area such that it does not attract large changes in buoyancy with change in wave elevation. The submerged body (1) supports a hydro turbine (4) which drives through a step-up gearbox (5) which is coupled to a generator (6) for extracting power from marine currents. The geometry of the submerged nacelle body plus surface piercing strut is arranged such that the still water centre of gravity [CoG] (7) aligns longitudinally with the centre of buoyancy [CoB] (8) of the device taking account of the additional trimming moment induced by the mooring system and that the CoB is vertically above the CoG thus ensuring the positive stability of the device.

The surface piercing strut (2) is streamlined to ensure low drag for current flow parallel to the axis of the turbine and high drag for current flow normal to the axis of the turbine such that it causes the device to align itself with the current flowing into the turbine by pivoting about its mooring system into the predominant current direction (9). Additional optional struts or skegs (10) and (11) can be fitted that extend down under the device to improve its directional stability and to provide support to keep the body upright for maintenance on the deck of a vessel or on land.

Figure 2:
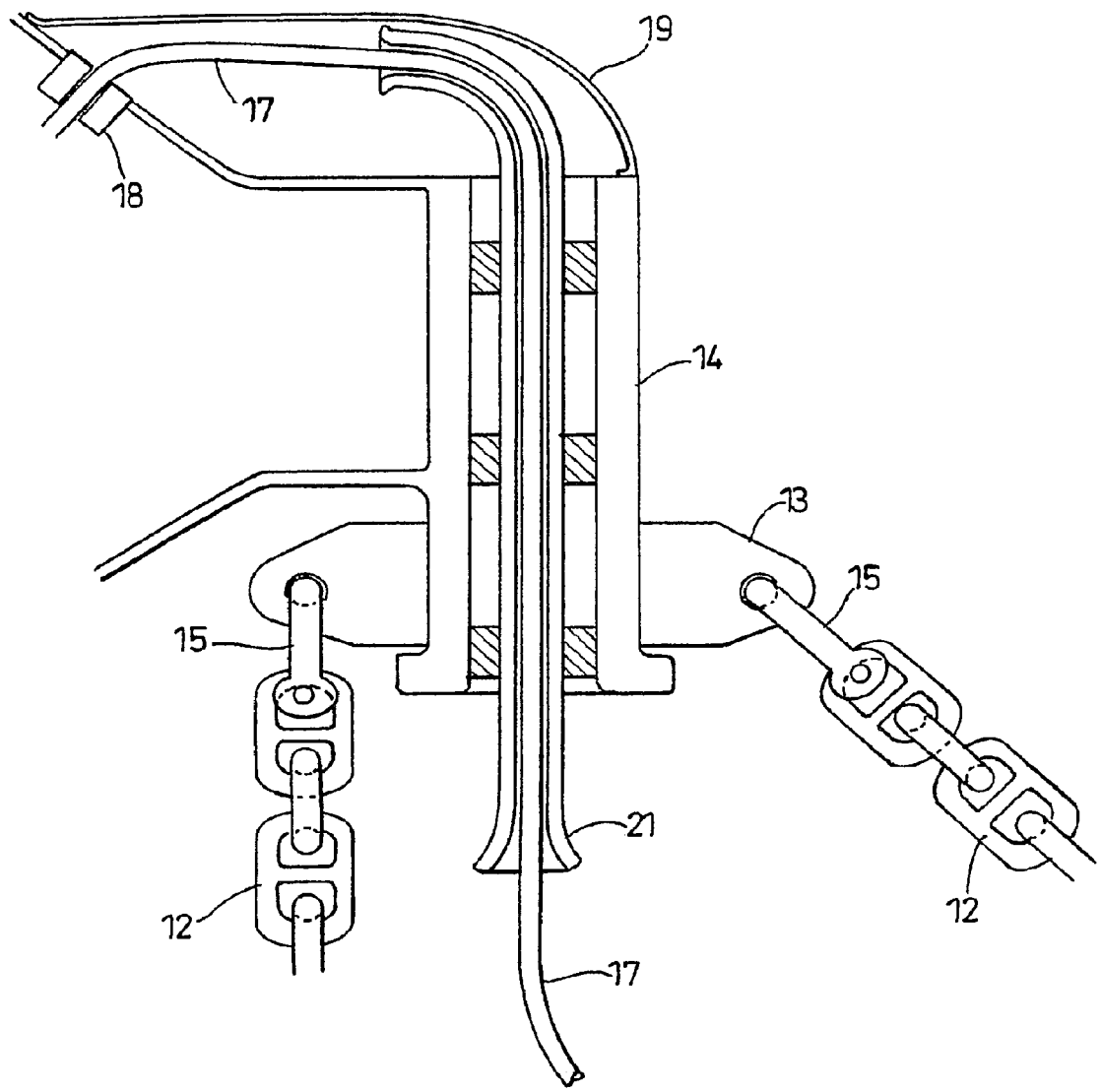
FIG. 2 shows details of the mooring attachment to the body.

In addition the semi-submerged device incorporates a mooring system that allows the device to pivot about a forward mooring connection point such that it naturally aligns itself with the predominant current direction. The mooring system consists of mooring lines (12) deployed such that they are aligned with the predominant current directions. In one embodiment of the device employing a mooring swivel the mooring spread is attached to a connector plate (13) which is free to swivel about a hollow mooring pipe (14) that is built into the upstream end of the device, an enlarged detail of which is shown in FIG. 2. The first section of the mooring line attached to the swivel will be chain or weighted line such that the slack mooring line hangs free and avoids fouling the turbine blades. Other elements of the mooring system include mooring connection shackles (15) and seabed anchors (16). The seabed anchors can be any of the type employed in the marine and offshore industries for restraining ships and floating offshore structures as appropriate to the seabed conditions.

The power export umbilical (17) exits the nacelle body through a watertight gland (18) and passes down through the hollow centre of the mooring pipe (14). The exposed umbilical is protected by a non watertight fairing (19) that shrouds the gland and the mooring pipe. On exiting the mooring pipe the umbilical is lead away clear of the mooring spread over a tethered mid-water buoy (20).

To avoid twist being introduced into the power export umbilical (17) a power transmission swivel, such as a slip ring system, could be incorporated in the mooring pipe. However a preferred alternative solution, which avoids the need for a power export swivel, is to restrain the umbilical where it passes down through the mooring pipe by gripping it with a protective sleeve (21) so that all of the rotation of the umbilical occurs outside the device where there is the greatest freedom of rotation of the umbilical.

To avoid the build up of twist in the umbilical a lateral thruster (22) is fitted that can exert a force to align the device during slack water such that when the current builds up it rotates the device in a prescribed direction that avoids the device rotating through more than 360 degrees from its original setup alignment. An onboard control system monitors the degree of rotation from the original alignment through the use of a pair of GPS trackers (23) mounted above the waterline.

An additional optional feature of the device is the incorporation of substantially horizontally mounted hydrofoils (24) attached to the struts or main body to induce hydrodynamic lift when subject to the current flow. By altering the angle of attack of the foils it is possible to create an upward or downward force on each foil. The foils are mounted on the body at a longitudinal distance from the mooring attachment point such that they can be angled to generate lift from the current flow to introduce a trimming moment that can be used to resist any mooring induced trimming moment and thus keep the device on a level trim for optimal turbine performance. In addition active control of the foils will allow the lift force to be used to counteract pitch motion such that the whole body pitch motion is substantially damped. This is only possible due to the small waterplane area of the surface piercing struts attracting reduced pitch exciting forces. The horizontal foils can also be used to generate a moment about the centre of gravity to resist wave induced roll motion.

An additional optional feature of the device is the introduction of an active flap device into the vertical strut. The active flap (25) is positioned below the waterline but at a height above the body's centre of gravity such that by activating the flap a lateral force is generated that creates a moment about the centre of gravity to counteract a wave induced roll moment This vertical flap can complement the anti-roll moment induced by the horizontal fins.

In FIG. 4 section A-A through the strut shows the option of applying asymmetry to the strut section in order to generate a lift force that counteracts the turbine torque reaction that is trying to destabilise the body.

Permanent solid ballast (26) and variable quantities of water ballast contained in ballast tanks (27) ensure that the device achieves the correct set-up draught and trim after the mooring lines are attached.

Figure 5:
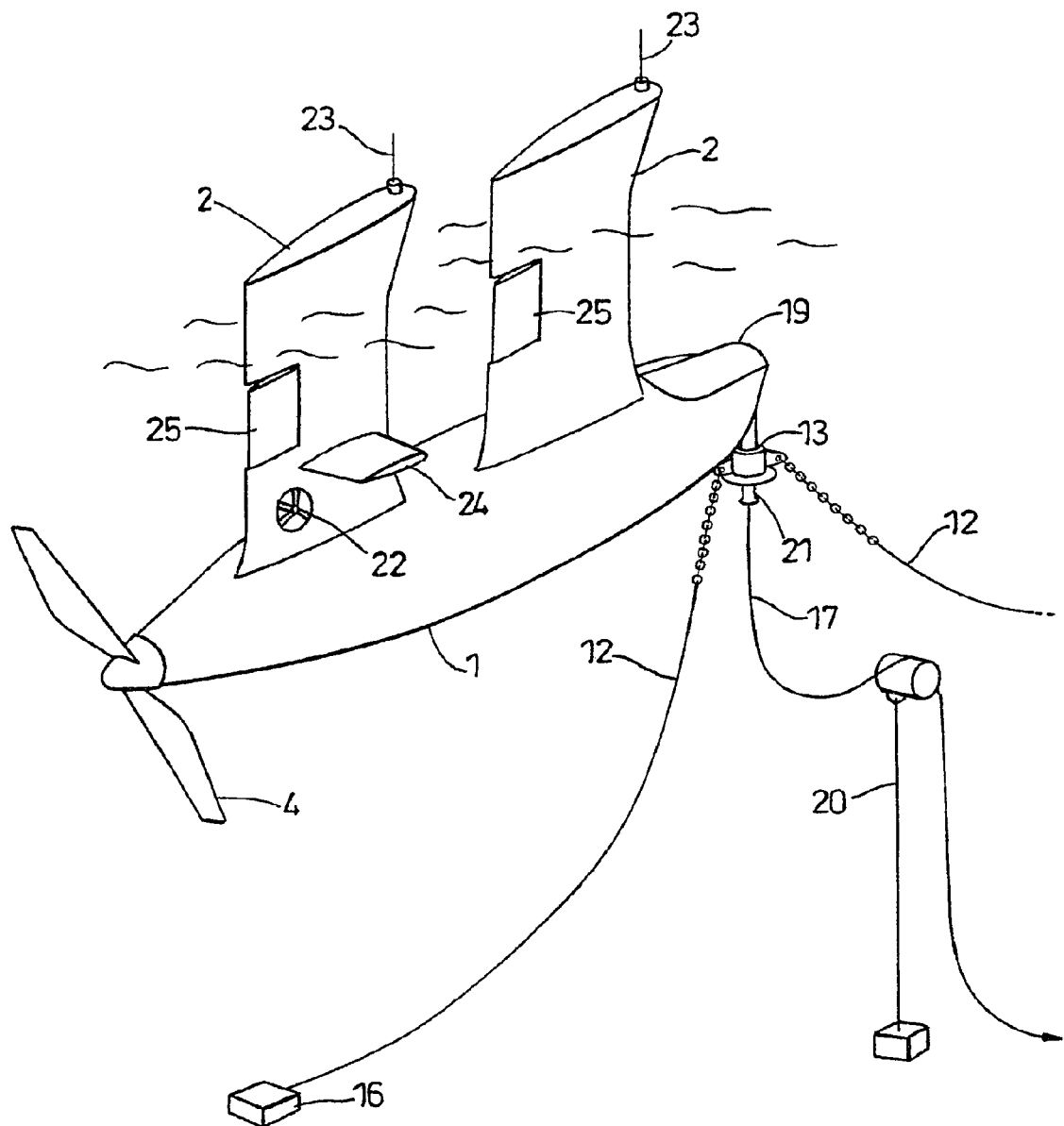
FIG. 5 shows in 3-D perspective view a mono-hull, twin-strut variant where the struts are spaced longitudinally.

FIG. 5 shows a variant of the mono-hull solution with twin vertical struts spaced longitudinally. This configuration of struts offers greater stiffness to resist trimming moments and pitch motion and therefore has application to sea areas where the waves are severe and are generally in line with the current direction. This embodiment of the device has all of the constituent parts identified for the mono strut version only there are now two vertical struts (2) spaced forward and aft along the main body's longitudinal axis. Longitudinal separation is maximised so as to provide greater resistance to any mooring load induced trimming moment and to provide increased pitch restoring moment. The active flap (25) can be used to produce a moment about the device's roll centre to resist wave induced roll motion. It can also be used to provide heading adjustment to overcome wind and wave forces to ensure that the device maintains the optimum heading for power production from the marine current.

Figure 6:
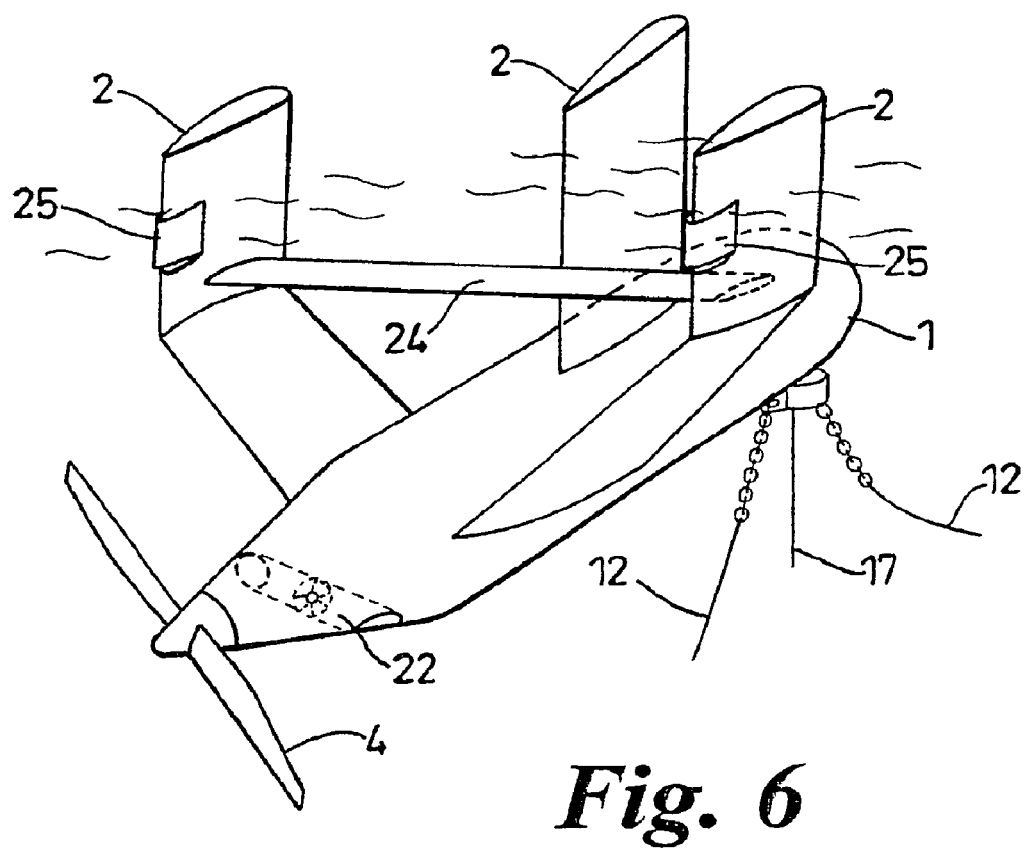
FIG. 6 shows in 3-D perspective view a mono-hull, three-strut variant where two of the struts are spaced transversely.
Figure 7:
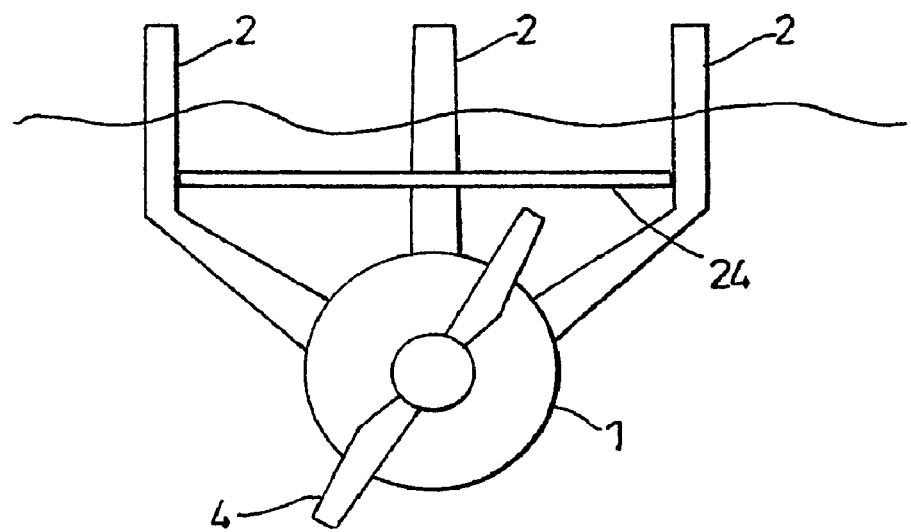
FIG. 7 shows the mono-hull, three strut variant in transverse view looking onto the turbine blade end.

FIGS. 6 and 7 show an embodiment of the device that has two transversely spaced vertical struts aft and one centreline vertical strut forward. This configuration provides both a pitch and roll restoring moment through change in immersion of the struts and therefore has application to sea areas where waves are severe and generally not aligned with the current direction. This transversely and longitudinally spaced geometry of the surface piercing struts (2) will act to dampen pitch and roll motion irrespective of current speed. In this variant the horizontally mounted hydrofoil (24) can also act as a support brace between the transversely separated struts. The active flaps (25) can be fitted to the trailing edge of one or more of the struts. The lateral thruster (22) can be fitted into the nacelle body above or below the shaft line.

Figure 8:
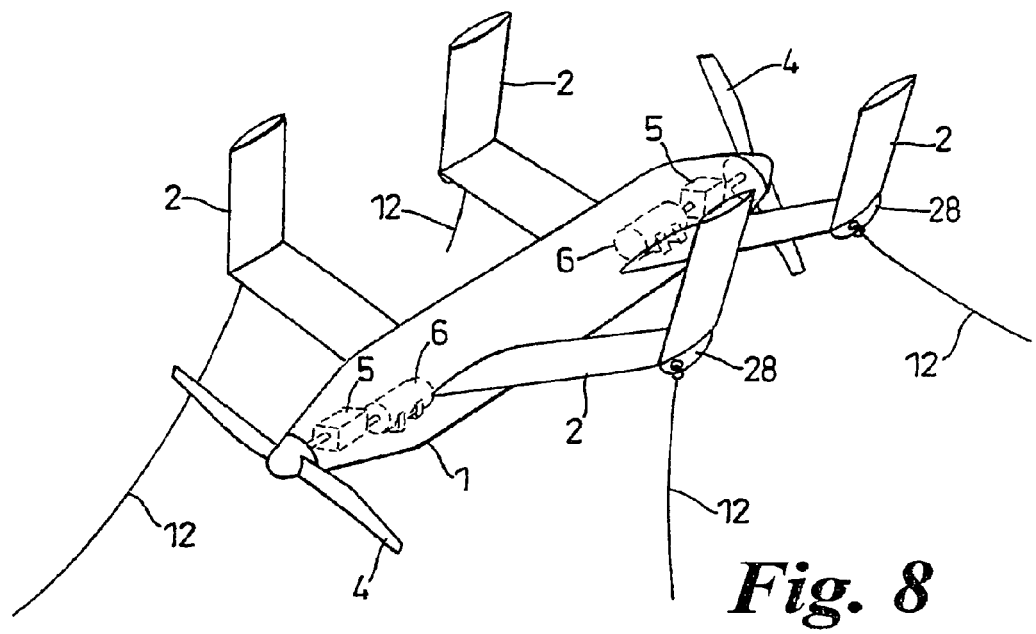
FIG. 8 shows in 3-D perspective view a mono-hull, twin rotor, four strut, spread moored variant.

FIG. 8 shows an embodiment of the device that is spread moored to be permanently aligned with the ebb and flow directions of the current. It has four surface piercing struts (2) that are spaced longitudinally and angled transversely so that the mooring connection points (28) lead the mooring lines (12) clear of the turbine blades (4). The transversely and longitudinally spaced surface piercing struts also act to provide pitch and roll stability. The device has a turbine (4) fitted at either end of the submerged body, each turbine being connected to its own gearbox (5) and generator (6).

Figure 9:
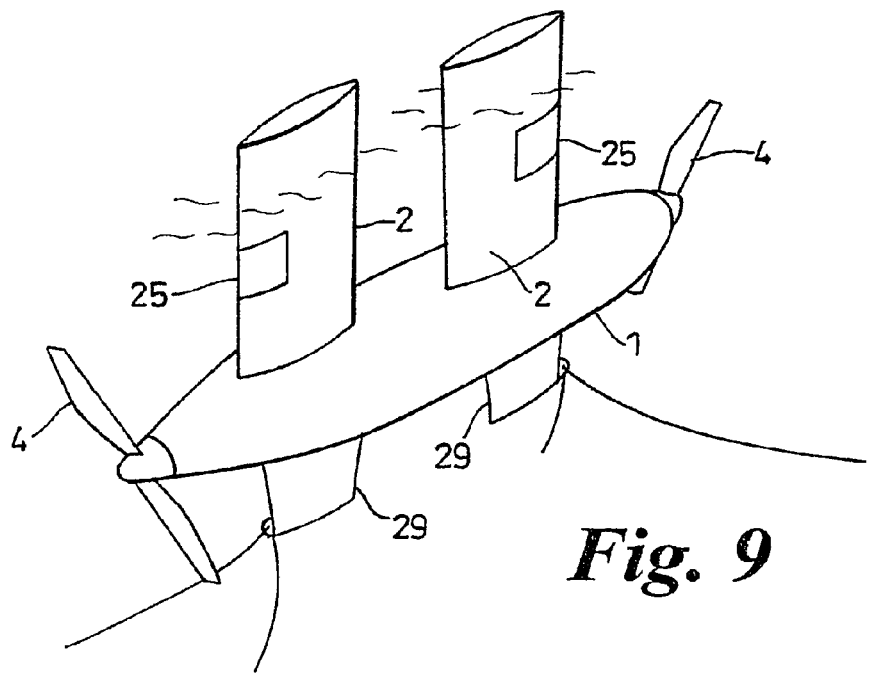
FIG. 9 shows in 3-D perspective view a mono-hull, twin rotor, twin strut, spread moored variant

FIG. 9 shows an embodiment of the spread moored variant that for simplicity has only two vertical surface piercing struts (2) plus further mooring support struts (29) that extend down below the hull to provide the spread mooring connection points. This variant has application to sea areas where the waves are mainly in line with the marine current and there is a low occurrence of waves running at ninety degrees to the current. To counteract wave induced roll motion the vertical struts can incorporate active flaps (25) to generate a restoring moment, only one of which would be active at any one time depending upon the direction of the marine current.

The invention claimed is:

1. A device for extracting the kinetic energy from a tidal stream or ocean current the device comprising: a buoyant semi-submerged structure having low motion characteristics moorable by a non-rigid mooring system, the buoyant structure supporting at least one substantially horizontal axis rotor, which in use is submerged, wherein the buoyant structure comprises at least one body, and at least one substantially vertical surface-piercing strut of small waterplane area attached to the body, wherein the at least one body provides the greater portion of the buoyancy of the structure and wherein the combined buoyancy of the at least one body and the at least one substantially vertical strut is sufficient to support the total weight of the device in water plus the vertical component of load of the mooring while maintaining a certain freeboard of strut above the design waterline providing reserve buoyancy.

2. A device according to claim 1, comprising at least two surface piercing struts.

3. A device according to claim 2, wherein at least two of the surface piercing struts are spaced apart longitudinally.

4. A device according to claim 2, wherein at least two of the surface piercing struts are spaced apart transversely.

5. A device according to claim 1, adapted to self align about its mooring connection point on a heading such that the rotor axis is substantially parallel to the flow.

6. A device according to claim 1, wherein the length of the at least one vertical strut is sufficient to ensure submergence of the axis of the rotor such that in use tips of the rotor are located sufficiently below the surface of the water to reduce the onset of cavitation.

7. A device according to claim 1, wherein the at least one vertical strut is streamlined so as to generate a low drag in current flow parallel to the axis of the rotor and a high drag in current normal to the axis of the rotor.

8. A device according to claim 1, wherein, in use, the at least one vertical strut pierces the water surface and wherein the water plane area is substantially constant for a distance above and below a waterline within a region of wave action.

9. A device according to claim 1, wherein the at least one surface piercing strut has a reserve of buoyancy above a static (zero current) waterline greater than the vertical load of the mooring system at maximum current speed.

10. A device according to claim 1, wherein the center of gravity of the device is lower than the center of buoyancy of the device.

11. A device according to claim 10, including ballast, the amount and location of the ballast in the device providing for the center of gravity of the device to be lower than the center of buoyancy.

12. A device according to claim 10, wherein the center of gravity is offset longitudinally from the center of buoyancy such that the device maintains substantially a level trim when subjected to forces induced by a mooring system.

13. A device according to claim 1, wherein the centers of gravity and buoyancy are substantially aligned longitudinally.

14. A device according to claim 1, further comprising means to generate a moment counteracting a reaction torque generated by the rotor driven generator.

15. A device according to claim 14, wherein the surface piercing struts provide a hydrostatic stabilizing moment to resist the moment induced by the reaction torque.

16. A device according to claim 14, wherein the at least one vertical strut is asymmetric in section to generate, under the influence of the current, a hydrodynamic lift forces that increases with current speed and counteracts rotor generated torque reaction.

17. A device according to claim 14, comprising a second rotor driving a second generator, wherein the second rotor operates in a counter rotational direction to the first rotor.

18. A device according to claim 1, further comprising at least one substantially horizontal lift surface.

19. A device according to claim 18, wherein at least a part of the at least one lift surface is adjustable.

20. A device according to claim 18, further comprising a control system, the control system controlling the orientation of the adjustable lift surfaces.

21. A device according to claim 1, further comprising at least one adjustable vertical rudder flap.

22. A device according to claim 21, further comprising a control system for controlling the orientation of the at least one adjustable vertical rudder flap.

23. A device according to claim 1, wherein the device is moored from a single point on the structure.

24. A device according to claim 1, moored by a multi-line mooring system wherein anchor points are positioned upstream and downstream of a desired location.

25. A device according to claim 24, wherein the mooring lines are pre-tensioned.

26. A device according to claim 24, wherein the mooring lines are brought together and connected to the device via a swivel arrangement.

27. A device according to claim 24, wherein the mooring system includes an active system for controlling the rotation of the device between changes in current direction, the active system including at least one thruster.

28. A device according to claim 27, wherein the required amount of orientation is determined by a GPS heading control system.

29. A device according to claim 24, further comprising a multi-line mooring system where the connection points are longitudinally separated on the device such that the mooring system restrains the device to align with the predominant ebb and flood directions of the current.

30. A device according to claim 1, further comprising a power export umbilical.

31. A device according to claim 30, wherein the power export umbilical includes a swivel.

32. A device according to claim 30, wherein the power export umbilical is restrained within the device against rotation.

* * * * *